United States Patent
Belge

(10) Patent No.: US 7,835,431 B2
(45) Date of Patent: *Nov. 16, 2010

(54) SYSTEMS AND METHODS FOR LOOP LENGTH AND BRIDGED TAP LENGTH DETERMINATION OF A TRANSMISSION LINE

(75) Inventor: Murat Belge, Malden, MA (US)

(73) Assignee: Aware, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,128

(22) Filed: Jan. 26, 2010

(65) Prior Publication Data

US 2010/0142602 A1  Jun. 10, 2010

Related U.S. Application Data

(63) Continuation of application No. 11/033,310, filed on Jan. 12, 2005, which is a continuation of application No. 09/755,172, filed on Jan. 8, 2001, now Pat. No. 6,865,221.

(60) Provisional application No. 60/224,308, filed on Aug. 10, 2000, provisional application No. 60/174,866, filed on Jan. 7, 2000.

(51) Int. Cl.
  *H04B 1/38*  (2006.01)
  *H04L 5/16*  (2006.01)
(52) U.S. Cl. ............. 375/222; 375/224; 379/1.04; 379/22.04; 379/24; 379/27.03; 379/28
(58) Field of Classification Search ........ 375/219, 375/222–224, 229–236; 379/22–23, 337, 379/380, 400, 414; 455/73, 500.1, 557
See application file for complete search history.

(56) References Cited

U.S. PATENT DOCUMENTS

| 4,571,733 | A | 2/1986 | Kaku et al. |
| 4,630,228 | A | 12/1986 | Tarczy-Hornoch et al. |
| 5,068,614 | A | 11/1991 | Fields et al. |

(Continued)

FOREIGN PATENT DOCUMENTS

EP  1041731  10/2000

(Continued)

OTHER PUBLICATIONS

Cioffi John M., ADSL Maintenance with DMT, T1E1.4 ADSL Project, Amati Communications Corporation, Dec. 1, 1992, pp. 1-14.

(Continued)

*Primary Examiner*—David C Payne
*Assistant Examiner*—James M Perez
(74) *Attorney, Agent, or Firm*—Jason H. Vick; Sheridan Ross, P.C.

(57) ABSTRACT

Through the use of a least squares minimization concept, the loop length, the number of bridged taps and length of the bridged taps on a transmission line can be determined from readily available modem data. In particular, the loop length, the number of bridge taps and the length of bridged taps can be estimated by comparing a measured frequency domain channel impulse response of the transmission line to a model of a loop that is comprised of multiple sections and multiple bridge taps.

14 Claims, 7 Drawing Sheets

U.S. PATENT DOCUMENTS

| | | | |
|---|---|---|---|
| 5,128,619 | A | 7/1992 | Bjork et al. |
| 5,864,602 | A | 1/1999 | Needle |
| 5,994,905 | A | 11/1999 | Franchville |
| 6,002,671 | A | 12/1999 | Kahkoska et al. |
| 6,058,162 | A | 5/2000 | Nelson et al. |
| 6,091,713 | A * | 7/2000 | Lechleider et al. .......... 370/248 |
| 6,177,801 | B1 | 1/2001 | Chong |
| 6,205,202 | B1 | 3/2001 | Yoshida et al. |
| 6,215,855 | B1 | 4/2001 | Schneider |
| 6,292,468 | B1 | 9/2001 | Sanderson |
| 6,292,539 | B1 | 9/2001 | Eichen et al. |
| 6,370,187 | B1 | 4/2002 | Agah |
| 6,487,276 | B1 | 11/2002 | Rosen et al. |
| 6,512,597 | B1 | 1/2003 | Cooper et al. |
| 6,512,789 | B1 | 1/2003 | Mirfakhraei |
| 6,516,049 | B1 | 2/2003 | Heidari et al. |
| 6,538,451 | B1 | 3/2003 | Galli et al. |
| 6,553,098 | B1 | 4/2003 | Harrison et al. |
| 6,584,176 | B2 | 6/2003 | Murphree et al. |
| 6,606,719 | B1 | 8/2003 | Ryckebusch et al. |
| 6,650,697 | B1 | 11/2003 | Tate et al. |
| 6,658,052 | B2 | 12/2003 | Krinsky et al. |
| 6,751,254 | B1 * | 6/2004 | Palm .......................... 375/222 |
| 6,829,330 | B2 | 12/2004 | Belge et al. |
| 6,865,221 | B2 | 3/2005 | Belge |
| 6,965,578 | B1 | 11/2005 | Kappes |
| 2001/0043568 | A1 | 11/2001 | McHale et al. |
| 2002/0041657 | A1 | 4/2002 | Ulanskas et al. |
| 2002/0090060 | A1 | 7/2002 | Rudinsky et al. |
| 2002/0114383 | A1 | 8/2002 | Belge et al. |
| 2002/0131537 | A1 * | 9/2002 | Storm et al. ................. 375/350 |
| 2003/0156685 | A1 | 8/2003 | Erving et al. |
| 2003/0198217 | A1 | 10/2003 | Redfern |
| 2003/0231023 | A1 | 12/2003 | Belge et al. |
| 2004/0076119 | A1 | 4/2004 | Aronson et al. |
| 2005/0123030 | A1 | 6/2005 | Belge et al. |

FOREIGN PATENT DOCUMENTS

| | | |
|---|---|---|
| GB | 2303032 | 2/1997 |
| JP | A-HEI 05-288794 | 11/1993 |
| JP | A-2000-332662 | 11/2000 |
| JP | 2000-613147 | 12/2002 |
| WO | WO 97/01900 | 1/1997 |
| WO | WO 99/26375 | 5/1999 |
| WO | WO 00/64130 | 10/2000 |
| WO | WO 01/01158 | 1/2001 |
| WO | WO 01/52439 | 7/2001 |
| WO | WO 02/13405 | 2/2002 |

OTHER PUBLICATIONS

Lewis L. et al.: "Extending Trouble Ticket Systems To Fault Diagnostics" IEEE Network, Nov. 1993, pp. 44-51, XP 000575228.

Marcos Tzannes "Draft New Recommendation G.996.1: Test Procedures For Digital Subscriber Line (DSL) Transceivers -For Approval", Mar. 1999, 2 pages.

Patrick Boets et al.: "The Modelling Aspect Of Transmission Line Networks" Proceedings Of The Instrumentation And Measurement Technology Conference, US, New York, IEEE, May 12, 1992, pp. 137-141, XP 000343913.

Ranier Storn et al. "Differential Evolution—A Simple And Efficient Adaptive Scheme For Global Optimization Over Continuous Spaces", Mar. 1995, 12 pages.

Rizzi, P. A., Microwave Engineering, Appendix C "Transmission Matrices", Prentice-Hall, Englewood Cliffs, N.J., 1988, pp. 534-540.

Storn, R. and Price, K., Differential Evolution—A Simple and Efficient Heuristic for Global Optimization over Continuous Spaces, Journal of Global Optimization 11, Kluwer Academic Publishers, 1997, pp. 341-359.

International Search Report for PCT/US01/00420 dated May 28, 2001; 4 pages.

Written Opinion for International (PCT) Patent Application No. PCT/US01/00420, mailed Feb. 20, 2002.

International Preliminary Examination Report for International (PCT) Patent Application No. PCT/US01/00420, mailed Apr. 29, 2002.

Examiner's First Report on Australian Patent Application No. 26326/01, mailed Feb. 18, 2004.

Notice of Acceptance for Australian Patent Application No. 2005211639, mailed Oct. 12, 2006.

Official Action for Canadian Patent Application No. 2,394,826, mailed Jun. 23, 2008.

Notice of Allowance for Canadian Patent Application No. 2,394,826, mailed Jun. 10, 2009.

Examination Report for European Patent Application No. 01900917.4, dated Jan. 21, 2003.

Examination Report for European Patent Application No. 01900917.4, dated May 4, 2004.

Decision to Grant European Patent for European Patent Application No. 01900917.4, dated Jun. 9, 2006.

European Search Report for European Patent Application No. 06013787, completed Nov. 7, 2006.

Examination Report for European Patent Application No. 06013787, dated Aug. 17, 2007.

Notification of Reason for Refusal for Japanese Patent Application No. 2001-552546, Dispatched Sep. 16, 2008.

Notification of Reason for Refusal (including translation) for Japanese Patent Application No. 2008-191009, Dispatched Apr. 27, 2009.

Decision of Refusal (including translation) for Japanese Patent Application No. 2008-191009, Dispatched Sep. 7, 2009.

Notice of Allowance for Japanese Patent Application No. 2008-191009, mailed Mar. 1, 2010.

Decision to Grant Patent (including translation) for Korean Patent Application No. 10-2002-7008792, dated Nov. 20, 2006.

Official Action for U.S. Appl. No. 11/033,310, mailed Jan. 23, 2008.
Official Action for U.S. Appl. No. 11/033,310, mailed Jun. 1, 2009.
Official Action for U.S. Appl. No. 11/033,310, mailed Nov. 17, 2008.
Official Action for U.S. Appl. No. 11/033,310, mailed Nov. 17, 2009.
Official Action for U.S. Appl. No. 11/033,310, mailed Apr. 21, 2010.
Official Action for U.S. Appl. No. 11/033,310, mailed Aug. 17, 2010.
Notice of Allowability for U.S. Appl. No. 11/033,310, mailed Sep. 8, 2010.

Notification of Reason for Refusal (including translation) for Japanese Patent Application No. 2010-000204, mailed Jun. 28, 2010.

* cited by examiner

SYSTEMS AND METHODS FOR LOOP LENGTH AND BRIDGED TAP LENGTH DETERMINATION OF A TRANSMISSION LINE

This application is a continuation of application Ser. No. 11/033,310 filed Jan. 12, 2005, which is a continuation of application Ser. No. 09/755,172 filed Jan. 8, 2001, now U.S. Pat. No. 6,865,221, which claims the benefit of and priority under 35 U.S.C. §119(e) to U.S. Provisional Application No. 60/174,866 filed Jan. 7, 2000, entitled "Systems And Methods For Loop Length And Bridged Tap Length Determination Of A Transmission Line," and U.S. Provisional Application No. 60/224,308 filed Aug. 10, 2000, entitled "Characterization Of Transmission Lines Using Broadband Signals In A Multi-Carrier DSL System," each of which are incorporated herein by reference to their entirety.

FIELD OF THE INVENTION

This invention relates to determination of transmission line characteristics. In particular, this invention relates to systems and methods for determining loop lengths and bridged tap lengths of a transmission line.

BACKGROUND OF THE INVENTION

The collection and exchange of diagnostic and test information between transceivers in a telecommunications environment is an important part of a telecommunications, such as an ADSL, deployment. In cases where the transceiver connection is not performing as expected, for example, where the data rate is low, where there are many bit errors, or the like, it is necessary to collect diagnostic and test information from the remote transceiver. This is performed by dispatching a technician to the remote site, e.g., a truck roll, which is time consuming and expensive.

In DSL technology, communications over a local subscriber loop between a central office and a subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form what is effectively a broadband communications channel. At the receiver end, the carriers are demodulated and the data recovered.

DSL systems experience disturbances from other data services on adjacent phone lines, such as, for example, ADSL, HDSL, ISDN, T1, or the like. These disturbances may commence after the subject ADSL service is already initiated and, since DSL for internet access is envisioned as an always-on service, the effect of these disturbances must be ameliorated by the subject ADSL transceiver.

SUMMARY OF THE INVENTION

Identifying, measuring and characterizing the condition of a transmission line is a key element of an ADSL deployment. In cases when the transceiver connection is not performing as expected, for example, the data rate is low, there are many bit errors, a data link is not possible, or the like, it is important to be able to identify the loop length and the existence, location and length of any bridged taps without having to send a technician to the remote modem site to run diagnostic tests.

This invention describes a system and method for estimating the loop length, the number of bridged taps and length of the bridged taps on a transmission line from readily available modem data. The loop length, the number of bridge taps and the length of the bridged taps can be estimated by comparing a measured frequency domain channel impulse response of the transmission line to a model of a transmission line that is composed of multiple sections and multiple bridge taps. The diagnostic and test information describing the condition of the line can then be exchanged, for example, by two transceivers during a diagnostic link mode, such as that described in U.S. patent application Ser. No. 09/755,173 filed Jan. 8, 2001, entitled "Systems And Methods For Establishing A Diagnostic Transmission Mode And Communicating Over The Same," now U.S. Pat. No. 6,658,052, which is incorporated herein by reference in its entirety.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

The exemplary embodiments of this invention will be described in relation to the application of the invention to an ADSL transceiver environment. However, it should be appreciated that in general the systems and methods of this invention will work equally well for any multiple section loop with one or more bridged taps.

For example, during the ADSL modem initialization, the frequency domain channel impulse response of the subscriber loop is measured at a set of discrete frequency values. The measured frequency values are designated as $H_m(f_i)$, and $f_i = i\Delta f$, for $i = 0, 1, \ldots, k-1$, where $\Delta f$ is the frequency spacing between adjacent samples.

Figure 1:
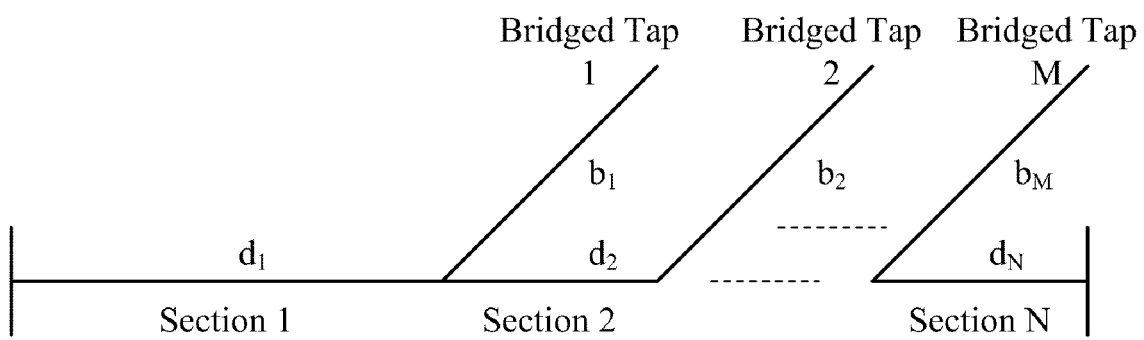
FIG. 1 illustrates an exemplary multiple section loop with multiple bridged taps.

FIG. 1 illustrates an exemplary model of a loop with N sections and M bridged taps. The frequency domain model for the channel impulse response for the loop in FIG. 1 can be written as $H(x,f)$, where f is the frequency and the vector x contains the lengths ($d_i$) of the N sections of the loop and the lengths ($b_i$) of the M bridged taps:

$$x = [d_1, d_2, \ldots, d_N, b_1, b_2, \ldots, b_M].$$

Assuming that the number of sections of the multiple section subscriber loop, N, and the number of bridged taps, M, are known, an estimate of the optimal parameter vector x that best approximates the measured channel impulse response $H_m(f_i)$ can be determined given the model $H(x,f)$. The optimal parameter vector set $x^*$ can be estimated by minimizing the norm of the difference between the measured and the model frequency response, at the discrete frequency values $f_i=i\Delta f$, for $i=0, 1, \ldots, k-1$. This minimization can be performed using the expression:

$$x^* = \min_x \sum_{i=0}^{k-1} \|H_m(f_i) - H(x, f_i)\|_2^2.$$

If the number of the bridged taps on the loop is not known, by adopting a large number of bridged taps in the model frequency response, and assuming that the minimization will converge to a solution with the correct number of bridged taps with non-zero length, the remaining bridge taps will have length zero.

The frequency domain model $H(x,f)$ can also incorporate the effect of, for example, an imperfectly matched transmission line, by including the effects of the load and source impedances.

More particularly, the loop characterization algorithms employ a model based approach to estimate the length of the loop and the lengths of up to two bridged taps. A channel characterization algorithm compares the measured channel impulse response to the channel impulse response of a loop model consisting of a single-gauge wire and containing up to two bridged taps. However, it is to be appreciated that the basic model can be extended to include multiple gauge wires and multiple bridged taps. The loop length and the bridged tap lengths are the parameters of the theoretical channel impulse response. The system varies the parameters of the theoretical model and evaluates the difference between the measured channel impulse response and the theoretical channel impulse response. The loop length/bridged tap lengths that minimize the error function are then declared as the estimated values. The presence of a bridged tap is declared if the bridged tap length is greater than a predetermined length, such as one hundred feet. This threshold for bridged tap detection was set experimentally. It was determined that for most loops there is a chance that a phantom bridged tap with a small length will be detected because of modeling inaccuracies and noise in the measurement system. Since the lengths of these phantom bridged taps were almost always below 100 ft, the exemplary threshold was set to 100 ft. However, in general the threshold can be altered depending on the particular operational environment and the complexity of the model.

There are two separate algorithms which perform loop characterization for downstream (DS) and upstream (US) data. For example, during modem initialization, data collection software collects the reverb signal by averaging K consecutive frames where $K \geq 64$. However, it is to be appreciated that as more averaging is performed, the less noisier the measurement will be. However, since there is a prescribed number of frames in the standard modem training where the reverb signal is transmitted, the exemplary number of averages was set at 64. The received reverb signal obtained in this way is an estimate of the impulse response of the entire channel including the front-end responses of the transmitting and receiving modems. The frequency domain received reverb signal is obtained in accordance with:

$$Rx(f) = \frac{1}{K} \sum_{k=1}^{K} FFT_N(rx(n)) \quad (1)$$

where f is a dummy variable denoting frequency and $rx(n)$, for $n=1, \ldots, N$, are the samples of the time-domain received reverb signal within a frame, with N being the number of samples contained in a single frame. Equation 1 may contain a slight abuse of notation because in reality the frequency variable f is not continuous but rather discrete and for this reason the channel impulse response is available at a set of discrete frequencies, called tones, which are multiples of $\Delta f=4312.5$ Hz:

$$f_i=i\Delta f, i=1, \ldots N/2. \quad (2)$$

The reverb signal is transmitted over a portion of the entire ADSL spectrum. For example, the reverb signal is available at 224 (96 in G.Lite) tones from $f_{32}=32\Delta f$ to $f_{255}=255\Delta f$ in the downstream channel and at 26 tones from $f_6=6\Delta f$ to $f_{31}=31\Delta f$ in the upstream channel. The downstream reverb signal is collected at the customer-premises equipment (CPE) and upstream reverb signal is collected at central office (CO). While there is no difference in the data collection process for the upstream or the downstream reverb signal, the characteristics of these two data sets are quite different. Specifically, the downstream reverb data contains significantly more information. Furthermore, there are more samples of the frequency domain reverb signal available in the downstream direction and these samples cover an extended range in the frequency domain where the effects of bridged taps on impulse response can be easily detected. However, there is one crucial difference between the upstream and the downstream data sets which complicates using the same interpretation algorithm for both. In the downstream channel, the matching of the front-end impedance to the loop impedance tends to be better than in the upstream channel. This makes it possible to use a simplified channel model for the downstream channel. Unfortunately, the impedance matching in the upstream channel is generally not as good as in the downstream channel and a more complicated channel impulse response should be used.

Due to these complications in channel modeling, and the lack of sufficient data samples, the basic upstream channel characterization algorithm is limited in terms of estimation accuracy and the number of bridged taps that can be detected. However, by extending the channel model to include multiple sections of varying gauges and/or more than two bridged taps, the presence of more than two bridged taps can be detected and more accurate results for the lengths of individual sections of the loop determined if there is a change of wire gauge along the loop. The only trade off is that as the number of model parameters increase, the computational effort needed to estimate the parameters will increase as well.

The following describes the theoretical details leading to the derivation of the frequency domain channel impulse response of the model and explains the channel characterization for both the downstream and the upstream data in detail. Both the downstream and the upstream interpretation algorithms employ the same least squares minimization concept where the square of the error norm between the actual and the theoretical channel impulse responses is minimized, but differ in the theoretical channel impulse response used.

For the loop characterization for downstream data, an exemplary two-wire loop is characterized by its characteristic impedance:

$$Z_0(\omega) = \sqrt{\frac{R + j\omega L}{G + j\omega C}}$$

And its propagation constant:

$$\gamma(f) = \sqrt{(R+j\omega L)(G+j\omega C)}$$

where $\omega = 2\pi f$ is the radian frequency and R (resistance), L (inductance), G (admittance) and C (capacitance) are the frequency dependent constants of the loop and vary with wire gauge. For a perfectly terminated loop, or a very long loop, with length d, and two bridged taps of lengths $b_1$ and $b_2$, the transfer function of the loop $H(d, b_1, b_2, f)$, is given by:

$$H(d, b_1, b_2, f) = \frac{e^{-d\gamma(f)}}{[2 + \tanh(b_1\gamma)][2 + \tanh(b_2\gamma)]} \quad (3)$$

In logarithmic scale:

$$\log|H(d,b_1,b_2,f)| = \log(2) - d\gamma(f) - \log[2+\tan h(b_1\gamma)] - \log[2+\tan h(b_2\gamma)]. \quad (4)$$

Note the linear dependence of the loop loss to the length of the cable. The actual transfer function of the loop can be measured during modem initialization. Then the measured transfer function of the loop is matched with that of a loop of length d with two bridged taps as given in Eq. 3. In other words, determining d, $b_1$, and $b_2$ minimizes the following least squares error criterion:

$$\min_{d,b,b} \sum_{i=if}^{il} |H(d, b_1, b_2, f_i) - Rx(f_i)|_2^2 \quad (5)$$

where $Rx(f_i)$ is the received reverb signal sampled at $f_i = i\Delta f$ and $i_f$ are $i_l$ are the first and the last tones $Rx(f_i)$.

Figure 2:
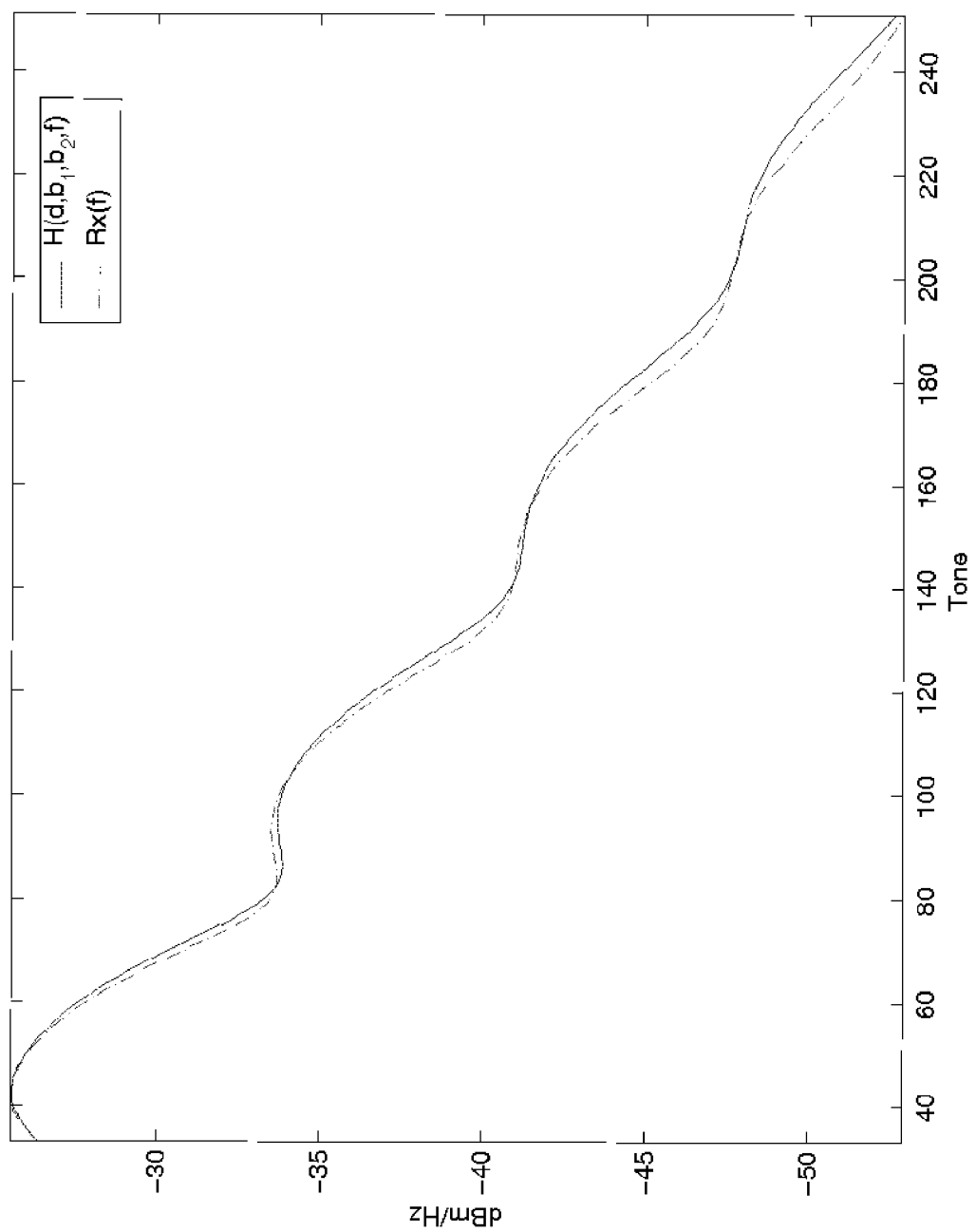
FIG. 2 illustrates a graph of the measured received reverb signal and the theoretical model for downstream data.

An example of the operation of the algorithm for an exemplary loop is illustrated in FIG. 2. Displayed are the measured received reverb signal Rx(f) and the theoretical model H (d, $b_1, b_2, f$) which were obtained by finding the model parameters d,$b_1,b_2$ that best match the data. Specifically, the observed (dashed line) received reverb signal Rx(f) is plotted against the theoretical channel model (solid line) $H(d,b_1,b_2,f)$ as functions of frequency for an exemplary 6000 ft loop with an exemplary single 1300 ft bridged tap. The exemplary loop consisted of a 26 awg. 6000 ft wire with a 26 awg. 1300 ft bridged tap close to the CPE. The model parameters best matching the observed data were found to be d=6000 ft, $b_1$=1300 ft and $b_2$=0 ft.

It follows from Eq. 5 that the interpretation algorithm basically does a search over the variables d, $b_1$ and $b_2$ and finds the ones minimizing the cost function given below:

$$E(d, b_1, b_2) = \sum_{i=if}^{il} |H(d, b_1, b_2, f_i) - Rx(f_i)|_2^2. \quad (6)$$

Since the cost function $E(d,b_1,b_2)$ is a nonlinear of d, $b_1$ and $b_2$, the function contains many local minima. Therefore, many well known optimization algorithms such as Gauss-Newton should not be used since these algorithms are unable to cope with multiple local minima and they converge to a local minimum of the cost function. In this exemplary embodiment the global minimum of $E(d,b_1,b_2)$ is desired. For this reason, a brute-force global minimization algorithm is used where the cost function is sampled at the points $(d^p, b_1^q, b_2^r)$, $d^p = p\Delta D$, $b_1^q = q\Delta b_1$ and $b_2^r = r\Delta b_2$ with p=1, ..., P, q=1, ..., Q and r=1, ..., R. Next the parameters $(d^p, b_1^q, b_2^r)$ which result in the minimum cost among the sampled values are chosen. This requires evaluating the cost function at P×Q×R locations.

In order to be able to determine the theoretical transfer function of the loop, $H(d,b_1,b_2,f)$, the frequency dependent propagation constant $\gamma(f)$ for a number of wires of different gauges needs to be stored. In an exemplary embodiment 24 awg. and 26 awg. wires are used which require 4×N locations to store the real and the imaginary parts of $\gamma(f)$ for N ADSL tones. Additionally, the analog front end (AFE) compensation curves need be stored which occupy N locations in memory. Depending on where the algorithm is implemented, the loop transfer function can be determined directly from Eq. 4, for example, if the algorithm were implemented on a personal computer or workstation, or it may be necessary to store the $\log[2+\tan h(b_1\gamma)]$ terms in regular intervals as required by the sampling procedure for $(d^p, b_1^q, b_2^r)$. For example, it is possible to pre-compute and store the $\log[2+\tan h(b_i\gamma)]$, i=1,2, from $b_1$=100 ft to $b_1$=2000 ft to in 100 ft intervals. Assuming low processor power, the $\log[2+\tan h(b_1\gamma)]$ terms can be predetermined and stored which take about 20×N locations for the real part only. Therefore, in this exemplary embodiment, the total memory is about (20+4+1+3)×N=28×N where 2×256 locations are needed to store intermediate variables determined during the execution of the algorithm.

Although it will not be shown here, it is possible to simplify the computation of the cost function $E(d,b_1,b_2,)$ so that only 12 multiplications and 15 additions are needed. This means that the total computational complexity of the algorithm is about P×Q×R×(11 multiplications+15 additions) plus some additional start-up computations which are negligible compared to the above figure.

Unlike the downstream interpretation case, for upstream interpretation it is more accurate to assume that the line is not perfectly terminated. Specifically, the impedance mismatch at the transmitter-line connection at the CPE modem and the impedance mismatch at the receiver-line connection at the CO modem become important factors that should be taken into account. While the basic idea behind the channel characterization algorithm for the upstream data remains the same, and involves matching a theoretical channel transfer function to the actual measured transfer function, the computation of the theoretical channel transfer function becomes much more involved. As with the downstream interpretation case, the channel transfer function is again measured by averaging K frames of the received reverb signal as given by Eq. 1.

The theoretical model for the channel transfer function in the upstream case can be described in two steps. The first step consists of writing the equations for the current and the voltage at the source (CPE), $I_s, V_s$, in terms of current and voltage at the load (CO), $I_L, V_L$, through the application of ABCD matrices:

$$\begin{bmatrix} V_s \\ I_s \end{bmatrix} = F^s \times A^i \times B \times A^2 \times F^L \times \begin{bmatrix} V_L \\ 0 \end{bmatrix}, \quad (7)$$

where $A^i$, B, $F^s$ and $F^L$ are 2×2 matrices whose elements are arrays of N elements. Here, $A^i$ is a matrix representing the frequency domain response of the ith section of the loop, B is the matrix representing the response of the bridged tap and $F^S$ and $F^L$ are the matrices representing the frequency domain response of the analog front end (AFE) hardware of the modem circuitry for TX (source) and RX (load) paths. From Eq. 7 the transfer function of the channel can be derived and is given by:

$$H(d_1, d_2, b, f) = \frac{V_L}{V_S}, \quad (8)$$

where $d_1$ is the length of the section before a bridged tap and $d_2$ is the length of the section after the bridged tap. Note that the CO interpretation algorithm uses a two-section, single bridged tap model. This is because of the limited number of frequency bins, fi=i$\Delta$f, from tone i=6 to i=32, at which the transfer function is available.

Entries of the above matrices are given as follows:

$A_{11}^i = A_{22}^i = \cos h(\gamma d_i)$ $A_{12}^i = Z_0 \sin h(\gamma d_i), A_{21}^i = A_{21}^i Z_0^{-2}$ Entries of matrix B:

$B_{11} = B_{22} = 1$ $B_{12} = 0, B_{21} = Z_j^{-1}(b)$

Where $Z_j^{-1} = \tan h(b\gamma)/Z_0$, and finally:

$F_{11}^S = F_{22}^S = 1, F_{12}^S = 0, F_{21}^S = Z_S$ $F_{11}^L = F_{22}^L = 1, F_{12}^L = 0, F_{21}^L = Z_L^{-1}$

The estimation algorithm minimizes the difference between the measured and the actual transfer functions:

$$\min_{d,d,b} \|H(d_1, d_2, b, f) - Rx(f)\|_2^2. \quad (9)$$

Figure 3:
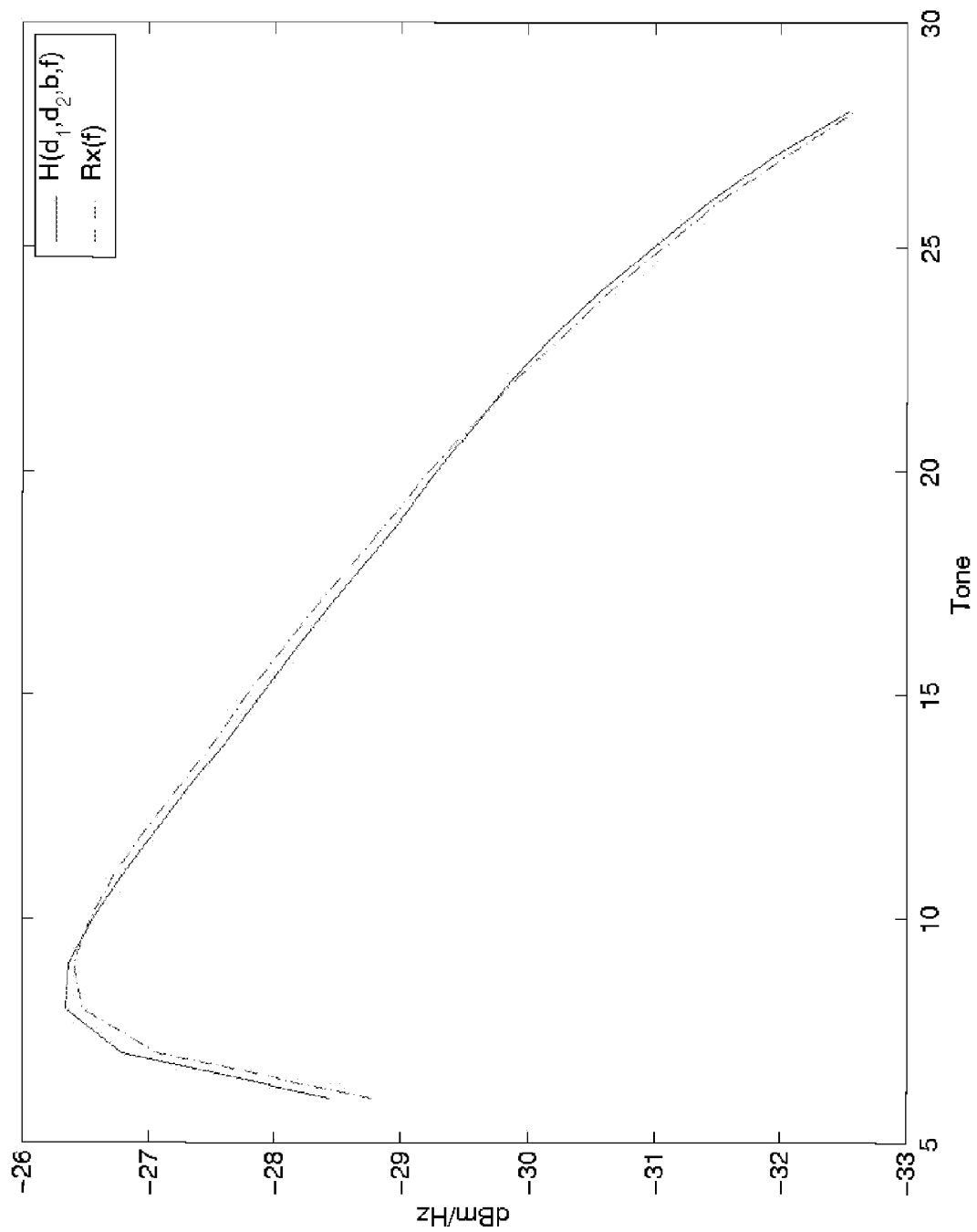
FIG. 3 illustrates a graph of the measured received reverb signal and the theoretical model for upstream data.

An example of the operation of the upstream loop length and bridged tap length estimation algorithm is illustrated in FIG. 3. Here the measured received reverb signal Rx(f) and the theoretical model $H(d, b_1, b_2, f)$, which was obtained by finding the model parameters $d, b_1 b_2$ that best match the data, are displayed. The exemplary loop consisted of 26 awg. 7700 ft wire with a 26 awg. 600 ft bridged tap 5900 ft away from CO. The model parameters best matching the observed data were found to be $d_1$=7900 ft, $d_2$=0 ft and b=500 ft. Note that although the $d_1$ and $d_2$ parameters found by the algorithm are different than their actual values, the actual values are $d_1$=5900 ft and $d_2$=1800 ft, the sum of $d_1+d_2$ is within 200 ft of the actual loop length. This example illustrates that even though the loop length is fairly accurate the location of the bridged tap is difficult to reliably estimate.

From the expressions leading to the theoretical channel transfer function, $H(d_1, d_2, b, f)$, it is clear that for the exemplary computation of the theoretical channel response $Z_S$, $Z_L$, $Z_0$ and $\gamma$, for 24 awg. and 26 awg., need be stored, and that $Z_j(b_1)$ characterizing the bridged tap is dependent on the bridged tap length. Assuming an exemplary resolution of 100 ft in bridged tap length and a maximum exemplary detectable bridged tap length of 2000 ft, there are 20 different $Z_j(b_1)$ arrays. Finally, the sin h(.) and cos h(.) elements of the matrices $A_1$ and $A_2$ are stored. Then, assuming a 500 ft resolution in loop length and a maximum measurable loop length of 20,000 ft, there should be 80×46 locations for storing entries of $A_i$. In total for storing these variables there should be 108×46 memory locations, including storage for Rx(f) and $H(d_1, d_2, b, f)$, and another 10×46 locations are needed for storing intermediate variables during the execution of the algorithm, giving a total of approximately 118×46 memory locations for this exemplary embodiment.

FIG. 3 illustrates the observed (dashed line) received reverb signal Rx(f) plotted against the theoretical channel model (solid line) H ($d_1, d_2$, J) as functions of frequency for an exemplary 7700 ft loop with a single 600 ft bridged tap.

During the search process, P values for $d_1$, Q values for b and R values for $d_2$ are selected and the cost function for each combination of $d_1, d_2, b$ determined. Thus, to determine the channel impulse response there are 4×(8×23 complex multiplications+4×26 complex additions). Therefore the total computational cost in this exemplary embodiment is P×Q×R×(32×26 complex multiplications+4×26 complex additions).

Figure 4:
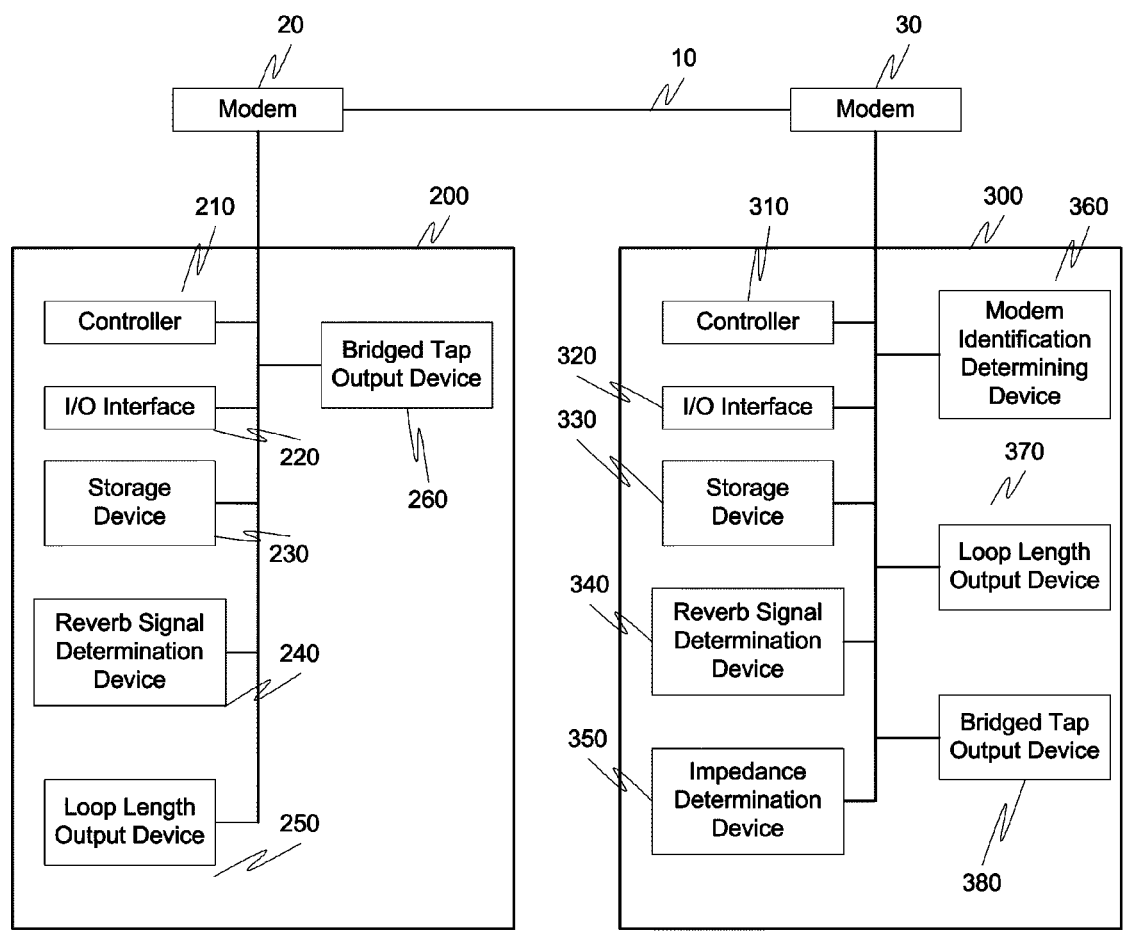
FIG. 4 is a functional block diagram illustrating an exemplary loop length and bridged tap length estimation system according to this invention.

FIG. 4 illustrates an exemplary loop length and bridged tap length estimation system according to an embodiment of this invention for downstream data. In particular, the loop length and bridged tap length estimation system 100 comprises a downstream loop length and bridged tap length determination device 200, an upstream loop length and bridged tap length determination device 300, a central office modem 20 and a consumer-premises modem 30, connected by link 10, such as a twisted pair. The a downstream loop length and bridged tap length determination device 200 comprises a controller 210, an I/O interface 220, a storage device 230, a reverb signal determination device 240, a loop length output device 250 and a bridged tap output device 260, connected by link 5. The upstream loop length and bridged tap length determination device 300 comprises a controller 310, an I/O interface 320, a storage device 330, a reverb signal determination device 340, an impedance determination device 350, a modem identification device 360, a loop length output device 370 and a bridged tap output device 380, connected by link 5.

While the exemplary embodiment illustrated in FIG. 4 shows the components of the loop length and the bridged tap length estimation system and associated components collocated, it is to be appreciated that the various components of the loop length and the bridged tap length estimation system 100 can be located at distant portions of a distributed network, such as a local area network, a wide area network, an intranet and/or the Internet, or within a dedicated loop length and bridged tap length estimation system. Thus, it should be appreciated that the components of the loop length and bridged tap length estimation system 100 can be combined into one device or collocated on a particular node of a distributed network. As will be appreciated from the following description, and for reasons of computational efficiency, the components of the loop length and the bridged tap length estimation system 100 can be arranged at any location, such as in a general purpose computer or within a distributed network without affecting the operation of the system.

Furthermore, the links 5 can be a wired or a wireless link or any other known or later developed element(s) that is capable of supplying electronic data to and from the connected elements.

In operation, for determination of the loop length and the bridged tap length in the downstream direction, the controller 210, in cooperation with the I/O interface 220 triggers initialization of the modem 20. The reverb signal determination device 240, in cooperation with the modem 20, the controller 210 and the I/O interface 220 determines a transfer function by averaging K consecutive frames of a reverb signal. The loop length, a first bridged tap length and a second bridged tap length are input from an input device (not shown) such as a computer, a laptop, a terminal, a transmission line testing device, or the like, or retrieved from the storage device 230.

The controller 210, in cooperation with the storage device 230, then determines the frequency domain propagation function for a specified wire gauge, and the frequency domain loop model. The calibrated and compensated reverb signals in the frequency domain are stored in the storage device 230 and the reference wire gauge input or retrieved from the storage device 230.

The controller 210, in cooperation with the storage device 230 determines the number of elements in the Rx function and the difference between the actual and the measured transfer function. The loop length output device, in cooperation with the I/O interface then outputs the estimated loop length to, for example, a computer, a laptop, a terminal, a transmission line testing device, or the like. Additionally, the bridged tap output device outputs the estimated bridged tap length to, for example, a computer, a laptop, a terminal, a transmission line testing device, or the like.

In operation, for determination of the loop length and bridged tap length in the upstream direction, the controller 310, in cooperation with the I/O interface 320 triggers initialization of the modem 30. The reverb signal determination device 340, in cooperation with the modem 30, the controller 310 and the I/O interface 320 determines a transfer function by averaging K consecutive frames of a reverb signal.

Next, the controller 310, in cooperation with the storage device 230, determines the frequency domain propagation function for a specified wire gauge, where the specified wire gauge is input or retrieved from the storage device 330.

The controller 310, in cooperation with the storage device 330 and the impedance determination device 350, determines the frequency domain impedance of the specified wire gauge. Then, the controller 310, in cooperation with the storage device 330 and the impedance determination device 350, determines the transmit impedance of the CPE modem and the receive impedance of the CO modem.

The controller 310, in cooperation with the storage device 330, determines the matrix representing the frequency domain responses of the $i^{th}$ section of the loop, the matrix representing the response of the bridged tap, and the $F^S$ matrix representing the AFE circuitry for the source (TX) and load (RX) paths and stores them in the storage device 330, and estimates the transfer function H. The calibrated and the compensated reverb signal in the frequency domain and the reference gauge of the wire are input or retrieved from the storage device 330.

The modem identification determining device 360 then determines the identification of the CO modem collecting the upstream reverb signal, and the identification of the CPE modem transmitting the upstream reverb signal. Knowing the number of elements in the Rx function, the controller 310 minimizes the difference between the actual and measured transfer functions, and outputs, with the cooperation of the loop length output device 370 and the bridged tap output device 380, the estimated loop length and the estimated bridged tap length, respectively.

Figure 5:
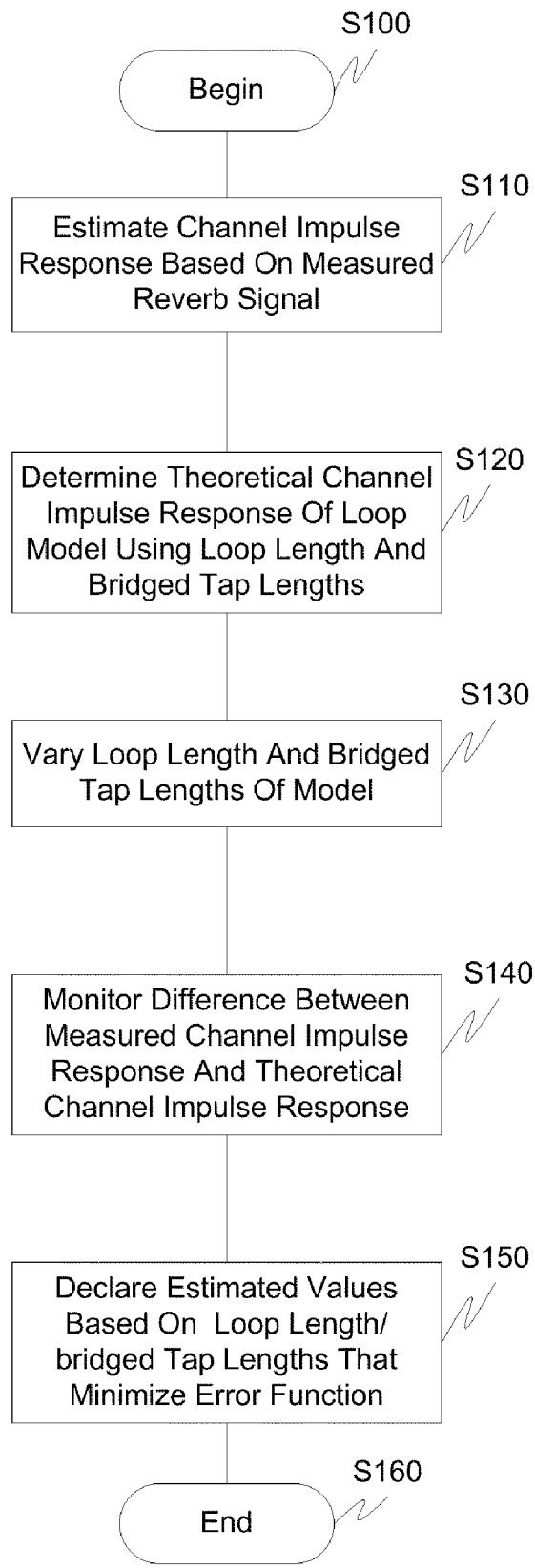
FIG. 5 is a flowchart outlining an exemplary general method for determining loop length and bridged tap lengths according to this invention.

FIG. 5 illustrates an exemplary method of determining a loop length and bridged tap lengths. In particular, control begins in step S100 and continues to step S110. In step S110, the channel impulse response is estimated based on a measured reverb signal. Next, in step S120, the theoretical channel impulse response of a loop model is determined using a loop length and the bridged tap lengths. Then, in step S130, the loop length and the bridged tap lengths of the model are varied. Control then continues to step S140.

In step S140, the difference between the measured channel impulse response and the theoretical channel impulse is monitored. Next, in step S150, the estimated values of the loop length and bridged tap length are declared based on the loop lengths and bridged tap lengths that minimize the error function between the measured channel impulse response and the theoretical channel impulse response. Control then continues to step S160 where the control sequence ends.

Figure 6:
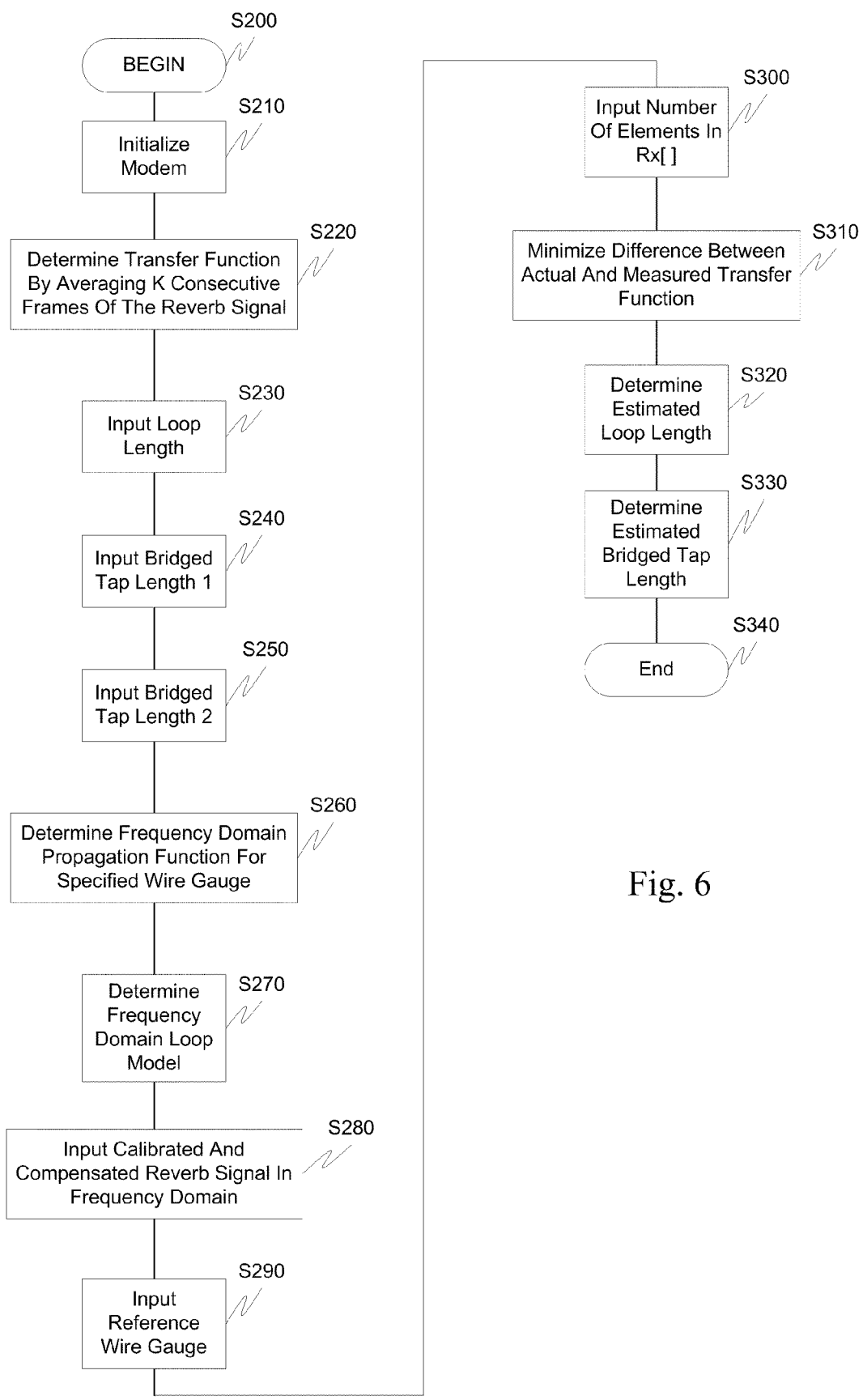
FIG. 6 is a flowchart outlining an exemplary method for estimating the loop length and bridged tap length in the upstream direction according to this invention.

FIG. 6 illustrates an exemplary method of determining the loop length and the bridged tap length for downstream data. In particular, control begins in step S200 and continues to step S210. In step S210, a modem is initialized. Next, in step S220, a transfer function is determined by averaging K consecutive frames of the reverb signal. Then, in step S230, the loop length is input. Control then continues to step S240.

In step S240, a first bridged tap length is input. Next, in step S250, a second bridged tap length is input. Next, in step S260, the frequency domain propagation function is determined for a specified wire gauge. Control then continues to step S270.

In step S270, the frequency domain loop model is determined. Next, in step S280, the calibrated and compensated reverb signals in the frequency domain are input. Then, in step S290, the reference wire gauge is input. Control then continues to step S300.

In step S300, the number of elements in the Rx function are input. Next, in step S310, the difference between the actual and the measured transfer function are determined. Then, in step S320, the estimated loop length is determined Control then continues to step S330.

In step S330, the estimated bridged tap length is determined Control then continues to step S340 where the control sequence ends.

Figure 7:
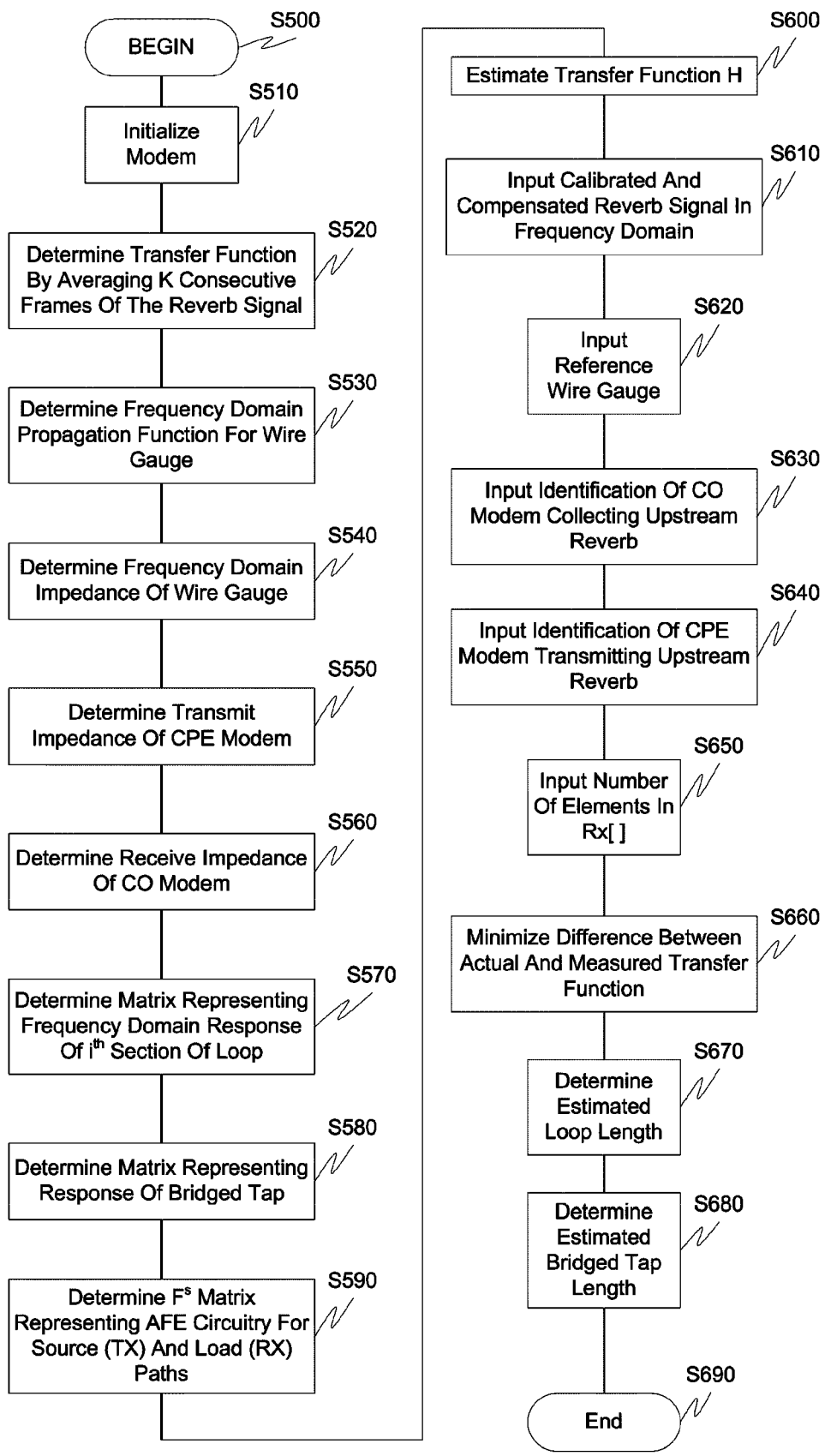
FIG. 7 is a flowchart outlining an exemplary method for estimating the loop length and bridged tap length in the downstream direction according to this invention.

FIG. 7 illustrates an exemplary method of determining the loop length and bridged tap length for upstream data. In particular, control begins in step S500 and continues to step S510. In step S510, the modem is initialized. Next in step S520, the transfer function is determined by averaging K consecutive frames of the reverb signal. Then, in step S530, the frequency domain propagation function for the wire gauge in use is determined. Control then continues to step S540.

In step S540, the frequency domain impedance of the wire gauge is determined. Next, in step S550, the transmit impedance of the CPE modem is determined. Then, in step S560, the receive impedance of the CO modem is determined Control then continues to step S570.

In step S570, the matrix representing the frequency domain responses of the $i^{th}$ section of the loop are determined. Next, in step S580, the matrix representing the response of the bridged tap is determined. Then, in step S590, the $F^S$ matrix representing the AFE circuitry for the source (TX) and load (RX) paths are determined Control then continues to step S600.

In step S600, the transfer function H is estimated. Next, in step S610, the calibrated and the compensated reverb signal in the frequency domain are input. Then, in step S620, the reference gauge of the wire is input. Control then continues to step S630.

In step S630, the identification of the CO modem collecting the upstream reverb signal is input. Next, in step S640, the identification of the CPE modem transmitting the upstream reverb is input. Then, in step S650, the number of elements in the Rx function are input. Control then continues to step S660.

In step S660, the difference between the actual and measured transfer functions are minimized. Next, in step S670, the estimated loop length is determined. Then, in step S680, the estimated bridged tap length is determined Control then continues to step S690 where the control sequence ends.

As illustrated in FIG. 4, the loop length and bridged tap length estimation system can be implemented either on a single program general purpose computer, or a separate program general purpose computer. However, the loop length and bridged tap length estimation system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, a modem, or the like. In general, any device capable of implementing a finite state machine that is in turn capable of implementing the flowcharts illustrated in FIG. 5-7 can be used to implement the loop length and bridged tap length estimation system according to this invention.

Furthermore, the disclosed method may be readily implemented in software using object or object-oriented software development environments that provide portable source code that can be used on a variety of computer or workstation hardware platforms. Alternatively, the disclosed loop length and bridged tap length estimation system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The loop length and bridged tap length estimation systems and methods illustrated herein, however, can be readily implemented in hardware and/or software using any known or later-developed systems or structures, devices and/or software by those of ordinary skill in the applicable art from the functional description provided herein and a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated loop length and bridged tap length estimation system, a modem, a dedicated loop length and/or bridged tap length estimation system, or the like. The loop length and bridged tap length estimation system can also be implemented by physically incorporating the system and method into a software and/or hardware system, such as the hardware and software systems of a dedicated loop length and bridged tap length estimation system or modem.

It is, therefore, apparent that there has been provided, in accordance with the present invention, systems and methods for loop length and bridged tap length estimation. While this invention has been described in conjunction with a number of embodiments thereof, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method to estimate a loop length of a transmission line comprising:
   estimating a first channel transfer function using one or more downstream signals from an initialization;
   estimating a second channel transfer function using one or more upstream signals from the initialization, the initialization occurring between a first broadband multicarrier modem on a first end of the transmission line and a second broadband multicarrier modem on a second end of the transmission line, the one or more downstream signals from the initialization having been transmitted or received using a first multiplicity of discrete frequency carriers and the one or more upstream signals from the initialization having been transmitted or received using a second multiplicity of discrete frequency carriers;
   determining a first theoretical channel transfer function;
   determining a second theoretical channel transfer function;
   comparing the first theoretical channel transfer function and the first estimated channel transfer function;
   comparing the second theoretical channel transfer function and the second estimated channel transfer function;
   determining a first estimated loop length of the transmission line based upon said comparison of the first theoretical channel transfer function and the first estimated channel transfer function; and
   determining a second estimated loop length of the transmission line based upon said comparison of the second theoretical channel transfer function and the second estimated channel transfer function.

2. The method of claim 1, wherein the estimating of one or more of the first and second channel transfer functions uses a REVERB signal.

3. The method of claim 1, further comprising estimating a bridged tap length.

4. The method of claim 1, further comprising outputting one or more of the estimated loop lengths.

5. The method of claim 1, wherein one or more of the first and second estimated channel transfer functions include multiple sections with varying gauges.

6. The method of claim 1, wherein one or more of the first and second theoretical channel transfer functions include multiple sections with varying gauges.

7. The method of claim 1, wherein the method is performed on at least one of a single program general purpose computer, a program general purpose computer, a special purpose computer, a programmed microprocessor, a microcontroller and peripheral integrated circuit element, an ASIC or other integrated circuit, a digital signal processor, a hard wired electronic or logic circuit, a discrete element circuit, a programmable logic device, a PLD, a PLA, an FPGA, a PAL, and a modem.

8. A loop length estimation system comprising:
   a controller; and
   a loop length output device capable of:
      estimating a first channel transfer function using one or more downstream signals from an initialization;
      estimating a second channel transfer function using one or more upstream signals from the initialization, the initialization occurring between a first broadband multicarrier modem on a first end of a transmission line and a second broadband multicarrier modem on a second end of the transmission line, the one or more downstream signals from the initialization having been transmitted or received using a first multiplicity of discrete frequency carriers and the one or more upstream signals from the initialization having been transmitted or received using a second multiplicity of discrete frequency carriers;

determining a first theoretical channel transfer function;

determining a second theoretical channel transfer function;

comparing the first theoretical channel transfer function and the first estimated channel transfer function;

comparing the second theoretical channel transfer function and the second estimated channel transfer function;

determining a first estimated loop length of the transmission line based upon said comparison of the first theoretical channel transfer function and the first estimated channel transfer function; and determining a second estimated loop length of the transmission line based upon said comparison of the second theoretical channel transfer function and the second estimated channel transfer function.

9. The system of claim 8, wherein the estimating of one or more of the first and second channel transfer functions uses a REVERB signal.

10. The system of claim 8, wherein the loop length output device is further capable of estimating a bridged tap length.

11. The system of claim 8, wherein the loop length output device is further capable of outputting one or more of the estimated loop lengths.

12. The system of claim 8, wherein one or more of the first and second estimated channel transfer functions include multiple sections with varying gauges.

13. The system of claim 8, wherein one or more of the first and second theoretical channel transfer functions include multiple sections with varying gauges.

14. The system of claim 8, wherein the loop length estimation system is implemented on at least one of a single program general purpose computer, a program general purpose computer, a special purpose computer, a programmed microprocessor, a microcontroller and peripheral integrated circuit element, an ASIC or other integrated circuit, a digital signal processor, a hard wired electronic or logic circuit, a discrete element circuit, a programmable logic device, a PLD, a PLA, an FPGA, a PAL, and a modem.

* * * * *